Figure 1:
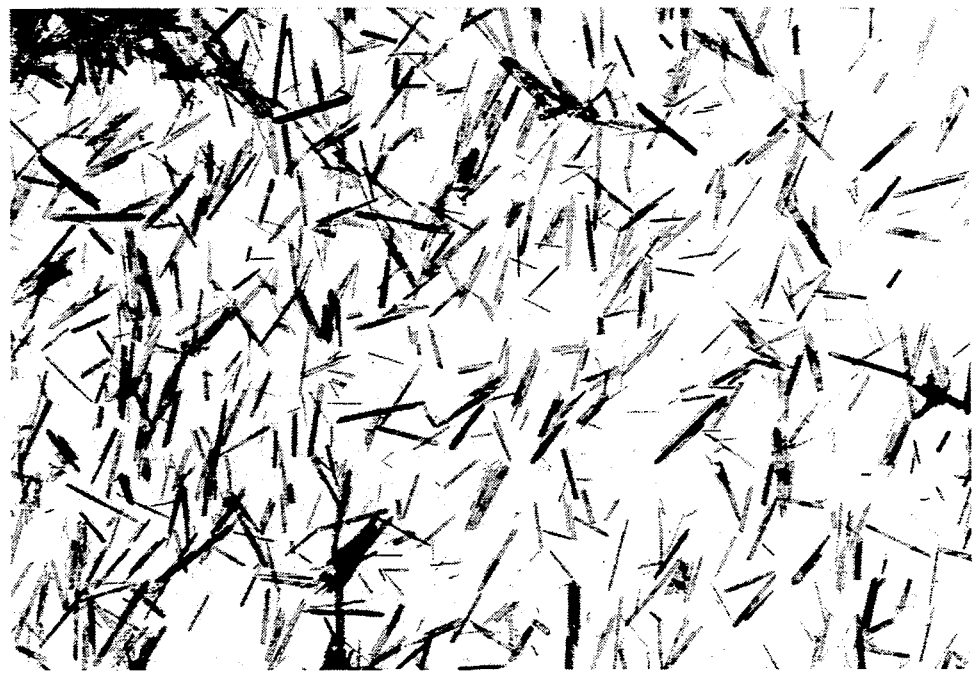

United States Patent [19]

Mueller et al.

[11] Patent Number: 5,030,371

[45] Date of Patent: Jul. 9, 1991

[54] PROCESS FOR PREPARING ACICULAR FERROMAGNETIC MATERIAL CONSISTING ESSENTIALLY OF IRON-CONTAINING CHROMIUM DIOXIDE

[75] Inventors: Michael W. Mueller, Plankstadt; Ekkehard Schwab, Neustadt; Helmut Auweter, Limburgerhof; Rainer Feser, Gruenstadt; Rudi Lehnert, Ludwigshafen; Norbert Mueller, Friedelsheim; Manfred Ohlinger, Frankenthal, all of Fed. Rep. of Germany

[73] Assignee: BASF, Ludwigshafen, Fed. Rep. of Germany

[21] Appl. No.: 429,772

[22] Filed: Oct. 31, 1989

[30] Foreign Application Priority Data

Nov. 5, 1988 [DE] Fed. Rep. of Germany ....... 3837646

[51] Int. Cl.$^5$ .............................................. C01G 37/27
[52] U.S. Cl. .............................. 252/62.55; 252/62.51; 252/62.56; 423/607
[58] Field of Search ............... 252/62.56, 62.51, 62.55; 423/607

[56] References Cited

U.S. PATENT DOCUMENTS

| 3,512,930 | 5/1970 | Bottjer et al. . |
| 3,529,930 | 9/1970 | Bottjer et al. . |
| 3,640,871 | 2/1972 | Kawamata et al. ............... 252/62.51 |
| 3,778,373 | 12/1973 | Robbins ............................ 252/62.51 |
| 3,911,095 | 10/1975 | Montiglio et al. . |
| 3,929,978 | 12/1975 | Morero et al. . |
| 3,979,310 | 9/1976 | Montiglio et al. . |
| 4,524,008 | 6/1985 | Chen ................................. 252/62.51 |

FOREIGN PATENT DOCUMENTS 0029687 11/1980 European Pat. Off. .
1524576 10/1975 United Kingdom .

OTHER PUBLICATIONS

Williams et al., An Analytical Model of the Write Process in Digital Magnetic Recording AIP Conference Proceedings, Series Editor Wolfe, No. t 1971, pp. 738-742.

*Primary Examiner*—Jack Cooper
*Attorney, Agent, or Firm*—Keil & Weinkauf

[57] ABSTRACT

An acicular, ferromagnetic material which has a high coercive force and essentially consists of iron-containing chromium dioxide is prepared by thermal decomposition of hydrated chromium(III) chromate under superatmospheric pressure.

2 Claims, 1 Drawing Sheet

PROCESS FOR PREPARING ACICULAR FERROMAGNETIC MATERIAL CONSISTING ESSENTIALLY OF IRON-CONTAINING CHROMIUM DIOXIDE

The present invention relates to an acicular ferromagnetic material essentially consisting of iron-containing chromium dioxide, which material is distinguished in particular by a high coercive force, and a process for its preparation.

Acicular chromium dioxide, its preparation and the use of this material for magnetic recording media have been described in a number of publications. Magnetic recording media which contain chromium dioxide generally have superior magnetic properties compared with recording media based on other magnetic oxides, the said properties being attributable to the high values for coercive force, specific remanence and saturation magnetization and in particular to the uniform shape and the small dimensions of the acicular chromium dioxide particles.

In addition to the synthesis of the chromium dioxide by a synproportionation reaction under hydrothermal conditions from chromium(III) and chromium(VI) oxides (cf. inter alia EP-A 27 640), the preparation of acicular chromium dioxide by thermal decomposition of hydrated chromium(III) chromate is also known. For example, DE-A 22 10 059 describes a process in which $Cr_2(CrO_4)_3 \cdot nH_2O$, where n is from 1 to 8, is decomposed at from 250 to 500° C. and under from 30 to 1,000 bar to give chromium dioxide. The product formed in this process has a coercive force which is too low for the recording media now customary and which decreases even further at higher values of n. Where the values of n are greater than 8, the remanent magnetization and the saturation magnetization then also decrease owing to the CrOOH then simultaneously formed. The magnetic properties can be improved by a process according to DE-A 23 32 854, in which a substance which undergoes exothermic decomposition under the given reaction conditions is mixed with the chromium(III) chromate. Modification of the chromium dioxide with lanthanum, yttrium, barium and strontium is also supposed to improve the magnetic characteristics, according to DE-A 29 19 572. Furthermore, modified chromium dioxide can also be prepared from chromium(III) chromates having a higher water content (degree of hydration n from 8 to 12) (DE-B 25 20 030 and DE-B 26 48 305).

The common feature of all these processes for the preparation of chromium dioxide from chromium(III) chromates is that, in order to avoid a decrease in the saturation magnetization due to the formation of CrOOH, only chromium(III) chromates having a relatively low water content, ie. a degree of hydration n of not more than 12, can be used. The products having a low water content are substantially in powder form and therefore require more expensive safety measures, for example encapsulation of the apparatuses or the installation of extraction apparatuses. In order to overcome these problems, the use of a chromium(III) chromate having a degree of hydration greater than 13 has therefore been proposed. This process also has the advantage that the magnetic properties of the resulting chromium dioxide can be improved, contrary to earlier assumptions.

The improvements form part of the efforts aimed at improving the magnetic properties of the chromium dioxide, in particular the coercive force, so that this material can also be used for the preparation of magnetic recording media required for the newly developed recording methods employing high recording density, especially in the video sector. Although it has been disclosed (FR-B-25 02 384) that a chromium dioxide having a very high coercive force can be prepared by doping with iridium, this process cannot be implemented for economic reasons. The same also applies to the coating of the chromium dioxide with cobalt compounds, which permits a substantial increase in the coercive force (Tatsuru Namikawa et al., Nippon Kugaku Kaishi 1980 (2), 194–198).

It is an object of the present invention to provide an acicular, ferromagnetic chromium dioxide material which, without the addition of iridium and without coating with cobalt, has a very high coercive force in conjunction with high values for the saturation magnetization.

We have found that this object is achieved by an acicular, ferromagnetic material which essentially consists of iron-containing chromium dioxide and which contains less than 2 ppm of iridium and less than 50 ppm of cobalt, based on the amount of chromium dioxide, and has a coercive force greater than 61 kA/m and a magnetization of more than 70 $nTm^3/g$, measured in a magnetic field of 380 kA/m.

The present invention furthermore relates to a process for the preparation of this material by decomposing a water-containing chromium(III) chromate of the formula $Cr_2(CrO_4)_3 \cdot nH_2O$ having a degree of hydration n of not less than 13 at from 200 to 500° C. and under from 50 to 700 bar, wherein the water-containing chromium(III) chromate is heated to 200–500° C. in a high pressure reactor and cooled immediately after this temperature has been reached and the high pressure reactor is vented.

The novel process can be carried out in a particularly advantageous manner if the chromium(III) chromate having a degree of hydration n of not less than 13, preferably from 14 to 20, is obtained by adding water to chromium(VI) oxide ($CrO_3$) in an amount such that, after partial reduction of the $CrO_3$ with an organic material, the required water content of the chromium(III) chromate results. The amount of water formed during the reduction must be taken into account here.

Since, in the preparation of chromium(III) chromates having a high water content, the amount of water added to the $CrO_3$ is generally not sufficient to effect complete dissolution, it is advantageous if the $CrO_3/H_2O$ starting suspension is subjected, together with the modifiers, to thorough dispersing, for example with a dissolver stirrer. The reduction of the $CrO_3$ is highly exothermic. To prevent the reaction suspension from being heated to an excessive extent, it is advisable to cool the reaction vessel during the reduction. To moderate the generally vigorous reaction between organic material and $CrO_3$, it has proven advantageous to dilute the reducing agent with water. However, in order to avoid changing the total water content of the chromium(III) chromate in this procedure, the amount of water used for partial dissolution of the $CrO_3$ must be reduced by an amount corresponding to the amount of water used for dilution of the reducing agent. Of the n moles of $H_2O$ of the $Cr_2(CrO_4)_3 \cdot nH_2O$, it has proven most advantageous to use four moles for diluting the reducing agent and the remaining (n−4) moles for the preparation of the CrO$_3$ suspension.

Suitable reducing agents for the chromium(III) chromate preparation are all conventional reducing agents, but preferably readily oxidizable organic compounds, such as alcohols and aldehydes, in particular less volatile polyhydric alcohols, such as glycol or glycerol. The Cr$^{6+}$/Cr$^{3+}$ molar ratio in the chromium(III) chromate should as far as possible be 1.5, but an excess or a deficiency of Cr$^{6+}$ may also be employed.

In the novel process, modified chromium dioxide materials are prepared, and it is appropriate to use known modifiers, such as antimony, tellurium, iron and/or their compounds and combinations of these substances. Usually, combinations of tellurium oxide and/or antimony oxide, if necessary in the form of the potassium antimonyl tartrate (EP-A 198 110), and iron oxide are particularly suitable. The modifiers are used in amounts of from 0.05 to 10% by weight, calculated as oxide and based on the resulting chromium dioxide. The modifiers should as far as possible be introduced into the CrO$_3$ suspension before the addition of the reducing agent.

The novel process is carried out, for example, by adding less water to the CrO$_3$ than would be required to obtain the predetermined degree of hydration of not less than 13 in the chromium(III) chromate. After the addition of the modifiers to the viscous mass, the mixture is thoroughly dispersed using suitable apparatuses. Thereafter, the resulting suspension is reduced in a stirred vessel provided with a dropping funnel and reflux condenser and coolable from outside, with thorough mixing, by slow addition of an organic reducing agent, for example glycerol, to which the remaining amount of water required for obtaining the final water content of the chromium(III) chromate has been added. The resulting pasty chromium(III) chromate is transferred to a stainless steel reaction vessel and then converted to chromium dioxide in a high pressure reactor under from 50 to 700 bar and at from 200 to 500° C. In the novel process, it is essential that, immediately after reaching the reaction temperature, the resulting material is cooled again, it being essential for the temperature to be reduced rapidly below, in particular, 220-250° C. This ensures homogeneous incorporation of the iron ions in the crystal lattice of the chromium dioxide. Simultaneously with or after cooling, the high pressure reactor is vented. The chromium dioxide is removed mechanically from the reaction vessel and is milled.

For further improvement of the synthesized chromium dioxides, thermal aftertreatment under oxidizing conditions at from 150 to 400° C. has been disclosed (DE-B 19 05 584). If necessary, the chromium dioxide obtained in the manner described can be further stabilized in a known manner, for example by the surface action of reducing agents (DE-B 1 925 541) or of alkalis (DE-A 3 600 624), by heating under an inert gas (EP-A 29 687) or by treatment with water-insoluble organic compounds and a surfactant (DE-A-36 10 411).

The novel material essentially consisting of chromium dioxide has a coercive force of more than 61, preferably from 61 to 78, kA/m, the magnetization being more than 70 nTm$^3$/g, measured in a magnetic field of 380 kA/m. Surprisingly, these high values for the coercive force are not achieved either by doping the chromium dioxide with iridium or by coating with cobalt.

Thus, this chromium dioxide material can particularly advantageously be used in magnetic recording media which are intended to be used for recording high information densities. The novel chromium dioxide is processed to magnetic recording media by known methods. For the production of the magnetic layer, from 2 to 10 parts by weight of chromium dioxide together with the binder and the suitable dispersants, lubricants and further conventional additives in a total amount of not more than 10% by weight, based on the chromium dioxide, are processed to give a dispersion. The dispersion thus obtained is filtered and is applied with a conventional coating apparatus, for example a knife coater, in one or more thin layers on the nonmagnetic substrate or in a thin layer on the magnetic recording medium already provided with another magnetic layer. Before the liquid coating mixture is dried at from 50 to 90° C., magnetic orientation of the chromium dioxide particles may be carried out. For special surface treatment of the magnetic layer, the coated film webs are passed between heated, polished rollers under pressure. Thereafter, the thickness of the magnetic layers are usually from 1.5 to 12 μm.

The binders used for the magnetic layers are the known polymer binders, such as acrylate copolymers, polyvinyl acetates, eg. polyvinylformal or polyvinylbutyral, relatively high molecular weight epoxy resins, polyurethanes and mixtures of these and similar binders. Elastomeric linear polyesterurethanes which are soluble in a volatile organic solvent and are virtually free of isocyanate groups have proven advantageous; these polykurethanes can be prepared by reacting a polyester of an aliphatic dicarboxylic acid of 4 to 6 carbon atoms, such as adipic acid, and one or more aliphatic diols of 3 to 10 carbon atoms, such as 1,2- and 1,3-propylene glycol, 1,4-butanediol, diethylene glycol, neopentylglycol or 1,8-octanediol, with a diisocyanate of 6 to 24, in particular 8 to 20, carbon atoms, such as toluylene diisocyanate or 4,4'-diisocyanatodiphenylmethane, preferably in the presence of a fairly small amount of a glycol of 4 to 10 carbon atoms, such as 1,4-butanediol, which produces chain extensions. Polyesterurethanes obtained from adipic acid, 1,4-butanediol and 4,4'-diisocyanatodiphenylmethane are preferred. Preferred polyesterurethanes have a Shore A hardness of from 70 to 100, a tensile strength of from 40 to 42 N/mm$^2$ (according to DIN 53,455) and an elongation at break (according to DIN 53,455) of about 440–560%. The K value according to H. Fikentscher (Cellulose-Chemie 13 (1932), page 58 et seq.) is from 40 to 60 (1% strength in dimethylformamide) for the particularly suitable polymer binders.

The Examples which follow illustrate the invention and compare it with the prior art. For the resulting chromium dioxide, the specific surface area SSA in [m$^2$/g] according to DIN 66,132 was determined using a Ströhlein areameter from Ströhlein, Düsseldorf, by the one-point difference method due to Haul and Dümbgen, and the magnetic properties were determined using a vibrating sample magnetometer in a magnetic field of 380 kA/m, these properties being the coercive force H$_c$ in [kA/m] and the specific remanence M$_r$/ρ and the saturation magnetization M$_s$/ρ in [nTm$^3$/g]. The mean tap density was ρ1.3 g/cm$^3$. The amount of cobalt and the amount of iridium were determined by atomic absorption spectrometry. The X-ray patterns were recorded using an automatic Siemens D 500 with copper Kα radiation. To determine the lattice constants, the $CrO_2$ samples were mixed with MICA (MBS standard SRM No. 675) as an internal standard and the measurements were carried out at 20° C. The position of the $CrO_2$ (110) line was related to the theoretical value of the MICA line (theta 26.774° C.) and the lattice constant a in [Å] was calculated from the measured difference. The stated length of the $CrO_2$ particles is an arithmetic mean determined by statistical evaluation and measurement of about 200 particles in electron micrographs.

IN THE DRAWING

FIG. 1 is an electron micrograph from which the average needle length of the particles produced in Example 3 was determined.

EXAMPLE 1

447 g of water were added to 1.5 kg of $CrO_3$ in a stirred glass vessel initially open at the top, and dispersing was carried out for 10 minutes using a dissolver stirrer at 1430 rpm. The amount of water initially taken was insufficient for complete dissolution of the $CrO_3$. Thereafter, 3.3 g of $TeO_2$ ($\doteq 0.26\%$ by weight, based on the $CrO_2$ being formed) and 45.3 g of $Fe_2O_3$ ($\doteq 3.6\%$ by weight) were added to the suspension, and the reaction vessel was sealed with a lid provided with a reflux condenser and a dropping funnel. The reaction vessel was furthermore equipped with a stirrer driven by a powerful motor. 334 g of water and 118.4 g of glycerol was slowly passed into the reaction suspension from the dropping funnel in the course of 120 minutes while refluxing, cooling the reactor wall with ice and stirring the $CrO_3$ suspension vigorously. A Te/Fe-modified chromium(III) chromate having an $H_2O$ content n of 16 resulted.

The $Cr_2(CrO_4)_3.16\ H_2O$ obtained in the above-mentioned manner was placed in a cylindrical stainless steel vessel and heated to 350° C. under 350 bar in a high pressure reactor and cooled again immediately after the temperature had been reached. The reactor was then vented. After cooling to room temperature, the $CrO_2$ formed was removed mechanically from the reaction vessel.

The reaction product was heated for 80 minutes at 180° C. It had a coercive force of 71.4 kA/m, a specific magnetization $M_s/\rho$ of 92 $nTm^3/g$ and a remanence of 43 $nTm^3/g$. The iridium content was less than 2 ppm and the cobalt content was less than 30 ppm. The SSA was 20 $m^2/g$, the lattice constant a was 4.430±0.0015 Å and the mean particle length was 300 nm.

EXAMPLE 2

447 g of water were added to 1,500 g of $CrO_3$ in a stirred glass vessel initially open at the top, and dispersing was carried out for 10 minutes using a dissolver stirrer. The amount of water initially taken was insufficient for complete dissolution of the $CrO_3$. Thereafter, 45.3 g of $Fe_2O_3$ (3.6% by weight), 1.89 g of $TeO_2$ (0.15% by weight) and 5.77 g of potassium antimonyl tartrate (0.2% by weight) were added and the mixture was dispersed again for 10 minutes using the dissolver stirrer. The reaction vessel was then sealed with a lid equipped with a reflux condenser and a dropping funnel.

117.3 g of glycerol in 924 g of water were added dropwise in only 48 minutes while refluxing, cooling the reactor wall with ice and stirring the $CrO_3$ suspension. A Te/Sb/Fe-modified chromium(III) chromate having an $H_2O$ content n of 16 resulted.

The product obtained was introduced in 170 g portions into cylindrical stainless steel vessels and converted in a high pressure reactor under the following conditions:

EXAMPLE 2a

Heating to 320° C. (maximum pressure 176 bar) followed by immediate cooling to room temperature and subsequent venting of the reactor.

EXAMPLE 2b

Heating to 340° C. (maximum pressure 224 bar) followed by immediate cooling to room temperature and subsequent venting of the reactor.

The product was removed from the reaction vessel, washed with water until the conductivity of the washwater had reached <100 μS/cm and dried. The products had the following magnetic properties:

|  | $H_c$ [kA/m] | $M_s/\rho$ [$nTm^3/g$] | $M_s/\rho$ [$nTm^3/g$] | SSA [$m^2/g$] |
| --- | --- | --- | --- | --- |
| Example 2a | 78.0 | 87.5 | 42.8 | 19 |
| Example 2b | 66.7 | 93.4 | 46.1 | 22 |

The lattice constants a of the pigment from Example 2a was 4.432±0.0015 Å, and that of the pigment from Example 2b was 4.426±0.0015 Å. The mean particle length of the pigment from Example 2a was 350 nm and that of the pigment from Example 2b was 300 nm.

EXAMPLE 3

The procedure described in Example 2 was followed, except that the dopants, 45.3 g of γ-$Fe_2O_3$ (3.6% by weight) and 3.28 g of $TeO_2$ (0.26% by weight), were dispersed together with the initially taken mixture of 1.5 kg of $CrO_3$ and 447.5 g of $H_2O$ for 10 minutes using the dissolver stirrer.

The resulting Te/Fe-modified chromium(III) chromate having 16 molecules of water of crystallization was placed in a cylindrical stainless steel vessel and heated to 318° C. under 240 bar in a high pressure reactor and cooled again immediately after the temperature had been reached. Thereafter, the pressure was let down and the resulting $CrO_2$ was removed from the reactor.

The reaction product was heated for 80 minutes at 180° C. in the air, then washed with water until the washwater had a conductivity of <100 μS/m and finally surface-treated according to DE-B 19 25 541 with a sodium sulfite solution.

The dried end product had the following properties:

| $H_c$ [kA/m] | $M_s/\rho$ [$nTm^3/g$] | $M_r/\rho$ [$nTm^3/g$] | SSA [$m^2/g$] |
| --- | --- | --- | --- |
| 73.2 | 90.1 | 41.2 | 36 |

The lattice constant a was 4.428±0.0015 Å and the average needle length was 300 nm (FIG. 1).

EXAMPLE 4

The procedure described in Example 2 was followed, except that 45.3 g of γ-$Fe_2O_3$ (3.6% by weight) and 4.42 g of $TeO_2$ (0.35% by weight) were used as dopants.

The resulting Te/Fe-modified chromium(III) chromate having 16 molecules of water of crystallization was placed in a cylindrical stainless steel vessel and heated to 340° C. under 216 bar in a high pressure reactor, been reached. After venting of the reactors, the resulting $CrO_2$ was removed and cooled again immediately after the temperature had from the reactor and washed with water until the washwater had a conductivity of <100 μS/m.

The end product had the following properties:

| $H_c$ [kA/m] | $M_m/\rho$ [nTm$^3$/g] | $M_r/\rho$ [nTm$^3$/g] | SSA [m$^2$/g] | a [Å] |
| --- | --- | --- | --- | --- |
| 61.4 | 95.3 | 45.5 | 31.4 | 4.428 ± 0.0015 |

COMPARATIVE EXPERIMENT 1

The procedure described in Example 1 was followed, except that, after the reaction temperature of 350° C. had been reached, the reaction mixture was kept at this temperature for a further 4 hours.

After the working up procedure as stated in Example 1, a coercive force of 59.8 kA/m, a specific magnetization of 92 nTm$^3$/g and a remanence of 42.1 nTm$^3$/g resulted. The iridium content was less than 2 ppm and the cobalt content less than 30 ppm.

The specific surface area was determined as 19 m$^2$/g, the lattice constant was 4.428±0.0015 Å and the mean particle size was 300 nm.

COMPARATIVE EXPERIMENT 2

The procedure described in Example 2 was followed, except that dopants were not added. The products obtained after preparation of the suspension was subjected to a high pressure treatment and subjected to the conditions below.

COMPARATIVE EXPERIMENT 2a)

Heating to 350° C. (maximum pressure 320 bar) followed by immediate cooling to room temperature and subsequent venting of the reactor.

COMPARATIVE EXPERIMENT 2b)

Heating to 330° C. (maximum pressure 232 bar) followed by immediate cooling to room temperature and subsequent letting down of the reactor.

The resulting powder was removed mechanically from the reaction vessels. The following powder properties were determined:

| $\rho$ | $H_c$ [kA/m] | $M_m/\rho$ [nTm$^3$/g] | $M_r/\rho$ [nTm$^3$/g] | SSA [m$^2$/g] |
| --- | --- | --- | --- | --- |
| 2a | 0 | 2.9 | 0.1 | 2 |
| 2b | 0 | 2.1 | 0.1 | 1 |

The resulting powder was identified as α-CrOOH by X-ray diffraction.

COMPARATIVE EXPERIMENT 3

380 g of $H_2O$ were initially taken in a reaction vessel having a volume of 2 l. First 973 g of $CrO_3$ were added while stirring, followed by 48.5 g of γ-$Fe_2O_3$ (3.6% by weight, based on chromium dioxide) and 5.56 g of potassium antimonyl tartrate (0.18% by weight) based on chromium dioxide. 480 g of chromium(III) oxide were now introduced with constant stirring, and stirring was continued for a further 30 minutes. The reaction suspension was then treated in an autoclave under the conditions below.

COMPARATIVE EXPERIMENT 3a)

Heating to 330° C., keeping at this temperature for 4 hours (maximum pressure 380 bar) followed by immediate cooling to room temperature, and subsequent venting of the reactor.

COMPARATIVE EXPERIMENT 3b)

Heating to 350° C., keeping at this temperature for 4 hours (maximum pressure 310 bar), followed by immediate cooling and subsequent venting of the reactor.

COMPARATIVE EXPERIMENT 3c)

Heating to 320° C., keeping at this temperature for 4 hours (maximum pressure 288 bar), followed by immediate cooling and subsequent venting of the reactor.

The products were heated for 80 minutes at 180° C. in the air. The following results were obtained:

| $\rho$ | $H_c$ [kA/m] | $M_s/\rho$ [nTm$^3$/g] | $M_r/\rho$ [nTm$^3$/g] | SSA [m$^2$/g] |
| --- | --- | --- | --- | --- |
| 3 a) | 58.4 | 98.2 | 47.3 | 32 |
| 3 b) | 58.5 | 98.7 | 48.2 | 33 |
| 3 c) | 58.3 | 99.2 | 49.4 | 31 |

The lattice parameters a of the products were 4.427±0.0015 Å in all three experiments and the mean needle lengths were 280–300 nm.

COMPARATIVE EXPERIMENT 4

121.7 g of $CrO_3$, 47.5 g of $H_2O$ and 60 g of $Cr_2O_3$ were dispersed with a dissolver stirrer, with formation of a viscous dark paste. The resulting mass was placed in a cylindrical stainless steel vessel and heated to 350° C. in a high pressure reactor (maximum pressure 304 bar) and then kept at this temperature for 4 hours. The mixture was then cooled and the reactor vented at room temperature.

The resulting $CrO_2$ was removed mechanically from the reaction vessel. The following powder properties were determined:

| $H_c$ [kA/m] | $M_s/\rho$ [nTm$^3$/g] | $M_r/\rho$ [nTm$^3$/g] | SSA [m$^2$/g] |
| --- | --- | --- | --- |
| 31.2 | 101.9 | 43.9 | 13.0 |

The mean needle length is 250 nm and the lattice constant a is measured as 4.424±0.0015 Å.

EXAMPLE B1

In a mill having a capacity of 500 parts by volume and containing 100 parts by volume of steel balls of 1.5 mm diameter, 40 parts of the chromium dioxide obtained in Example 1 and aftertreated with a sodium sulfite solution were mixed with 175 parts of a 13% strength solution of a thermoplastic polyesterurethane of adipic acid, 1,4-butanediol, 4,4'-diisocyanatodiphenylmethane in a mixture of equal amounts of tetrahydrofuran and dioxane, 150 parts of a 13% strength solution of a commercial polyvinylformal in a mixture of equal amounts of tetrahydrofuran and dioxane, 24 parts of a solvent mixture of equal amounts of tetrahydrofuran and dioxane and 1 part of zinc stearate, and the mixture was dispersed for 4 hours. Thereafter, the same amounts of the two binder solutions, 13.5 parts of the stated solvent mixture and 0.1 part of a commercial silicone oil were added and dispersing was continued for a further 30 minutes. The dispersion was then filtered and was applied in a conventional coating apparatus, by means of a knife coater, to a polyethylene terephthalate film in a thickness such that, after drying and calendering, the thickness of the resulting dry layer was 5.5 μm. Directly after the liquid dispersion has been poured on, the acicular chromium dioxide particles were oriented by means of a magnetic field along the recording direction. The magnetic properties measured on the tape samples, ie. the coercive force $H_c$ in [kA/m], the remanent magnetization $M_r$ in [mT] and the relative remanence Mr/Ms, the orientation ratio Rf, the ratio of the residual induction in the playing direction to that in the crosswise direction and the switching field distribution SFD according to Williams and Comstock (AIP Conf. Proc. 5 (1971), 738) are shown in the Table.

EXAMPLES B2–B5

The procedure described in Example B1 was followed, except that the chromium dioxide materials shown in the Table were used.

TABLE

| | $CrO_2$ from | $H_c$ [kA/m] | Mr [mT] | Mr/Ms | RF | SFD |
|---|---|---|---|---|---|---|
| B 1 | Example 1 | 69.3 | 146 | 0.89 | 3.4 | 0.22 |
| B 2 | Example 2a | 77.5 | 147 | 0.85 | 2.5 | 0.21 |
| B 3 | Example 4 | 63.9 | 146 | 0.89 | 4.0 | 0.25 |
| B 4 | Comp. Exp. 1 | 58.2 | 150 | 0.88 | 3.1 | 0.23 |
| B 5 | Comp. Exp. 3a) | 58.8 | 147 | 0.87 | 3.3 | 0.20 |

We claim:
1. A process for the preparation of an acicular, ferromagnetic material consisting essentially of iron-containing chromium dioxide, which comprises decomposing a water-containing chromium (III) chromate of the formula $Cr_2(CrO_4)_3 \cdot n\ H_2O$ having a degree of hydration n of not less than 13 and containing, as modifiers, iron and at least one component selected from the group consisting of antimony and tellurium and compounds of these elements in total amount of 0.05 to 10% by weight, calculated as oxide and based on the resulting chromium dioxide, in a high-pressure reactor at a temperature of from 318 to 350° C. and under a pressure of from 50 to 700 bar to form chromium dioxide; cooling the resulting chromium dioxide immediately after the said temperature has been reached to a temperature below 250° C.; and venting the reactor either simultaneously with, or after, said cooling step, the ferromagnetic material thus obtained containing less than 2 ppm of iridium and less than 50 ppm of cobalt, based on the amount of chromium dioxide, and having a coercive force greater than 61 kA/m and a magnetization of more than $70 nTm^3/g$, measured in a magnetic field of 380 kA/m.

2. The process of claim 1, wherein the degree of hydration n of the chromium (III) chromate is from 14 to 20.

* * * * *